Dec. 20, 1966  R. M. DONALDSON  3,292,901
TURBINE APPARATUS

Filed March 4, 1965  3 Sheets-Sheet 1

INVENTOR
ROBERT M. DONALDSON

By Shoemaker and Mattare
ATTORNEYS

Dec. 20, 1966   R. M. DONALDSON   3,292,901
TURBINE APPARATUS

Filed March 4, 1965   3 Sheets-Sheet 3

INVENTOR.
ROBERT M. DONALDSON
By Shoemaker and Mattare
ATTORNEYS

United States Patent Office 3,292,901
Patented Dec. 20, 1966

1

3,292,901
TURBINE APPARATUS
Robert M. Donaldson, Hampton, Va., assignor to Newport News Shipbuilding and Dry Dock Company, Newport News, Va., a corporation of Virginia
Filed Mar. 4, 1965, Ser. No. 437,244
10 Claims. (Cl. 253—117)

The present invention relates to new and novel hydraulic turbine apparatus, and more particularly to an improved draft tube construction employed with hydraulic turbines of the reaction type.

The present invention is particularly concerned with hydraulic turbine apparatus such as the turbines commonly used in hydroelectric power plants and the like. Such turbines may be of Francis or Kaplan type and may also include fixed vane propellor type turbines.

It is well recognized in the art that at loads above and below the design load of a hydraulic turbine, the liquid leaving the runner has an appreciable whirl which results in vorticity in the draft tube of the turbine, this vorticity often causing objectionable noise and vibration, instability of operation or pressure surges and power swings in the draft tube, spiral case and penstock.

The present invention provides an arrangement wherein flow control means is incorporated in the draft tube of the apparatus. This flow control means is of such a construction as to stabilize the flow in the draft tube by reducing the vortex while at the same time not interfering with the whirling motion of the liquid whereby the performance of the turbine will not be appreciably affected at its design load and will be significantly improved at loads above and below the design load. This improved stabilized flow operation serves to substantially reduce the noise, vibration, pressure surges and power swings with no appreciable loss in power or efficiency.

The flow control means includes a generally tubular or annular body means which is fixedly mounted in the upper part of the draft tube and is spaced from the inner surface of the draft tube and substantially concentric therewith. This body means defines a central bore formed therethrough, and the liquid from the runner flows through the bore in the body means and around the outer periphery of the body means in passing downwardly through the draft tube. The axially extending portions of the body means are oriented approximately in line with the flow of liquid from the runner when it is operating at its design load so as to provide a minimum of interference with the whirling motion of the liquid.

The flow control means is also spaced a particular distance from the undersurface of the runner, this distance being within a certain critical range of distances as related to the inner diameter of the top portion of the draft tube. The inner diameter and length of the bore extending through the body means of the flow control means is also related to the inner diameter at the top portion of the draft tube such that such inner diameter and length of the bore must be within certain critical ranges as related to the inner diameter at the top portion of the draft tube.

In one modification of the invention, the body means may comprise a substantially cylindrical means while in another modification the body means is of a substantially frusto-conical configuration having a central bore formed therethrough. In a still further modified form of the invention, streamlining means is provided on the support means for the body means, such streamlinging means being freely movable with respect to the support means so as to automatically move into proper position for minimizing resistance and interference to the normal whirling motion of the liquid.

A further modification of the invention includes the

2 above possible structural features and also contemplates the provision of means for introducing gas to the upper central portion of the bore provided through the body means so as to cushion the shocks and smooth out the flow of liquid through the flow control means.

An object of the present invention is to provide new and novel hydraulic turbine apparatus which substantially reduces the noise attendant with operation thereof.

Another object is the provision of hydraulic turbine apparatus wherein vibration of the apparatus is substantially reduced.

Still another object of the invention is to provide hydraulic turbine apparatus wherein pressure surges are substantially reduced.

Yet a further object of the invention is the provision of hydraulic turbine apparatus wherein power swings are minimized.

Yet another object of the invention is to provide hydraulic turbine apparatus wherein the performance is not appreciably affected at the design load and wherein considerably improved performance is provided at loads above and below the design load with no appreciable loss in power or efficiency.

A still further object of the invention is the provision of hydraulic turbine apparatus which is quite simple and inexpensive in construction, and yet which is at the same time efficient and reliable in operation.

Other objects and many attendant advantages of the invention will become more apparent when considered in connection with the specification and accompanying drawings, wherein.

Figure 1:
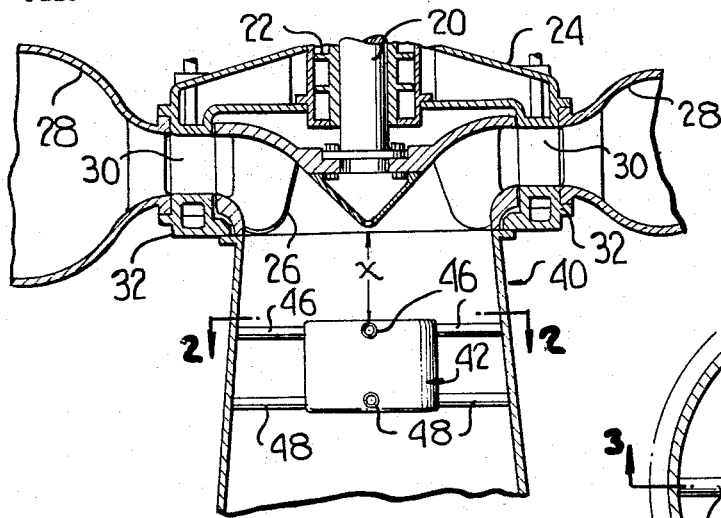
FIG. 1 is a vertical section through a portion of a hydraulic turbine incorporating the present invention.
Figure 2:
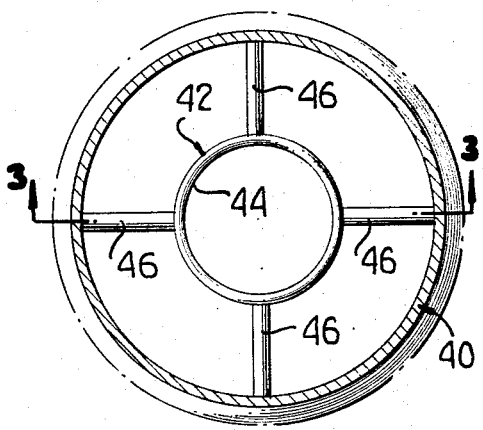
FIG. 2 is a sectional view taken substantially along line 2—2 of FIG. 1 looking in the direction of the arrows.

Referring now to the drawings wherein like reference characters designate corresponding parts throughout the several views, a first modification of the invention is illustrated in FIGS. 1–4 inclusive and includes a shaft 20 of a hydraulic turbine which extends through bearing 22 in cover plate 24. A runner 26 is connected with the lower end of shaft 20, this runner being shown as being of the Francis reaction type. Liquid such as water is supplied to runner 26 by way of the conventional spiral case 28, the flow of water being controlled by a gate comprising a plurality of vanes 30 mounted for movement in the cover plate and in a lower casing portion 32.

Water is discharged from the runner vertically downwardly into a draft tube indicated generally by reference numeral 40. The structure described up to this point is that of the usual Francis reaction type turbine and further details of construction of the turbine are not considered necessary.

The flow control means includes a generally annular or tubular body means indicated generally by reference numeral 42, this body means in this particular configuration comprising a substantially cylindrical ring member having a bore 44 extending therethrough. Body means 42 is supported in spaced relationship from the inner surface of the draft tube and substantially concentric with the draft tube such that the longitudinal axes of the draft tube and the body means 42 coincide with one another.

The body means 42 defines a substantially continuous imperforate side wall portion, and it will be noted that a plane passing through the longitudinal axis of the draft tube will intercept the inner and outer surfaces of the body means 42 so as to define straight lines. These straight lines of course extend axially of the body means and are disposed substantially parallel with the adjacent axially extending portions of the draft tube. A cylindrical body means may be employed as long as the taper or divergence of the draft tube is not too great. Where the length of the body means 42 is not too long and the divergence of the draft tube is less than approximately 5%, the body means may be cylindrical. If the divergence of the draft tube is greater than 5%, a different shaped body means may be employed as hereinafter described.

The body means is fixedly supported in the upper part of the draft tube by a first plurality of tubular support members 46 shown as being four in number and equally spaced about the body means, these support members extending between the outer surface of body means 42 and the inner surface of the draft tube. Four similar support members 48 are provided beneath members 46. The number and size of the support members should be the minimum required to support the assembled apparatus in the operating environment and to prevent any significant vibration thereof. The various components including the draft tube, the body means and the associated support members may comprise a welded assembly of structural steel or other suitable materials.

It should be noted with the arrangement described above, the axially extending portions of the body means are oriented to be approximately in line with the flow of water from the runner when it is operating at its design load.

Figure 4:
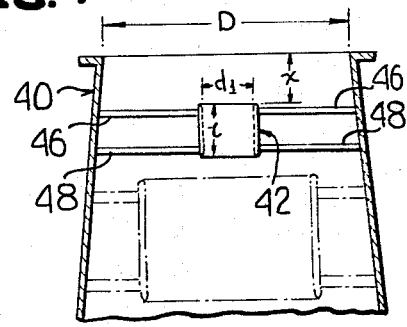
FIG. 4 is a view illustrating the flow control means disposed within the draft tube and illustrating the critical limits of the size and location of the flow control means.

The flow control means is located at a specific position relative to the runner, and its positioning and dimensions may be more clearly understood from a consideration of FIGS. 1 and 4. The distance $x$ is intended to denote the distance from the upper end of body means 42 to the top of the draft tube 40. This distance is critical for proper operation of the apparatus and should be in a range of approximately 20% to approximately 50% of the inner diameter of the draft tube at the top portion thereof as indicated by D.

The inner diameter $d_1$ and the length $l$ of the bore formed through the body means also has a critical relationship to the distance D. In order to afford proper operation of the apparatus, $d_1$ should be in the range of approximately 20% to approximately 70% of D, and $l$ should be in the range of approximately 20% to approximately 50% of D.

In FIG. 4, the body means 42 illustrated in solid lines indicates the minimum dimensions of the variable $x$, $d_1$ and $l$. The phantom line illustration of the body means illustrates the maximum distances of these various variable quantities. It will be understood that various combinations of sizes in between these limits can be provided. These variables will depend on each particular turbine installation and on the design of the water passages of the turbine. However, these variables must be within the critical ranges as discussed above in order to provide the new and improved results of the present invention.

Figure 3:
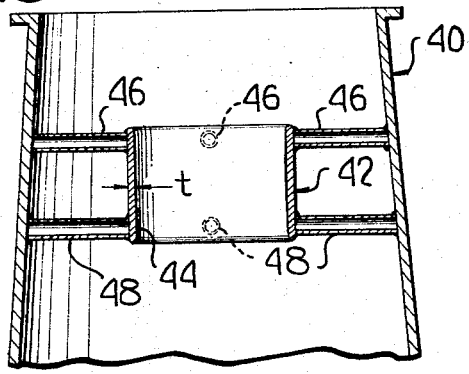
FIG. 3 is a sectional view taken substantially along line 3—3 of FIG. 2 looking in the direction of the arrows.

It will also be noted that the thickness of the wall portion of body means 42 should be of the minimum required to prevent any significant vibration or weakening of the apparatus, and this wall thickness as indicated by $t$ in FIG. 3 is many time less than the inner diameter of the bore 44 extending through the body means. It is contemplated that this thickness will ordinarily be at least 50 times less than the inner diameter of bore 44.

Figure 5:
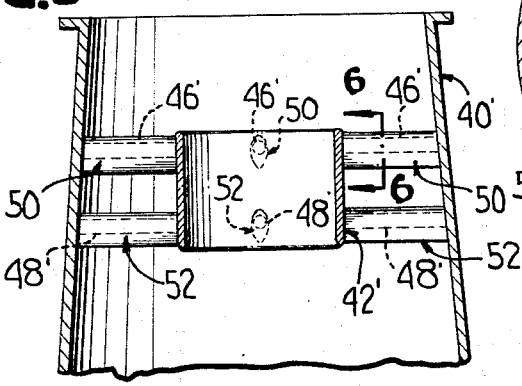
FIG. 5 is a vertical section through a draft tube incorporating a modified form of the flow control means.
Figure 6:
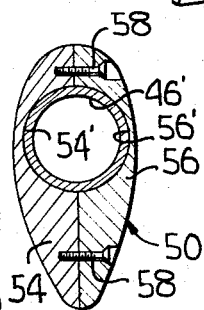
FIG. 6 is a sectional view taken substantially along line 6—6 of FIG. 5 looking in the direction of the arrows.

Referring now to FIGS. 5 and 6, a modification of the invention is illustrated wherein the draft tube and the flow control means is substantially identical with that previously described, and similar parts have been given the same reference numerals primed. The only difference in this particular modification is the fact that the support members 46' are surrounded by streamlining members or portions 50, and support members 48' are surrounded by streamlining portions or members 52. Each of these streamlining members is of substantially identical construction, and the details thereof are illustrated in FIG. 6. As seen in this figure, streamlining portion 50 includes a pair of complementary members 54, 56 which are provided with semi-cylindrical inwardly facing cutouts 54' and 56' respectively which are adapted to fit about the outer surface of the associated support member 46'. Members 54 and 56 are held together by screws 58 which are adapted to be threaded through aligned openings provided in the two adjacent members.

The streamlining portions 50 as well as 52 are fitted about the associated support members such that they are freely rotatable or movable thereabout. With this arrangement, the streamlining members can automatically move into position so as to afford maximum resistance to flow thereabout. Accordingly, the streamlining members will rotate about the associated support members under the influence of the flowing water so as to conform with the direction of flow of water therepast. This of course serves to minimize interference with the flow of water thereby increasing the efficiency of the apparatus.

Figure 7:
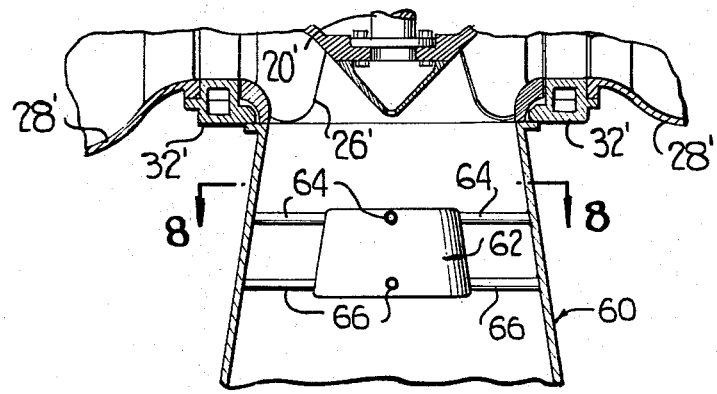
FIG. 7 is a vertical section similar to FIG. 1 illustrating a further form of the invention.
Figure 8:
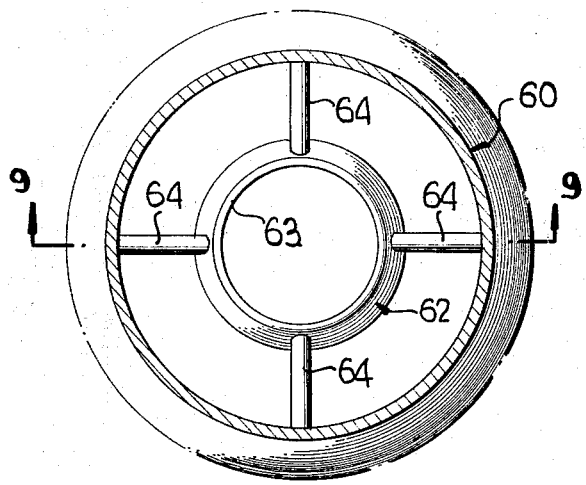
FIG. 8 is a sectional view taken substantially along line 8—8 of FIG. 7 looking in the direction of the arrows.
Figure 9:
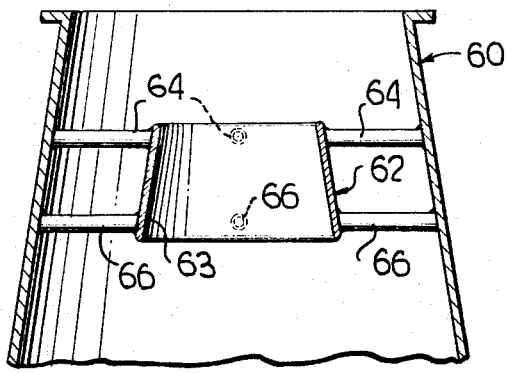
FIG. 9 is a sectional view taken substantially along line 9—9 of FIG. 8 looking in the direction of the arrows.

Referring now to FIGS. 7 through 9 inclusive, a further modified form of the invention is illustrated wherein the turbine runner and associated parts are similar to those previously described and have been given the same reference numerals primed. In this modification, the draft tube 60 is modified from that previously illustrated in that it diverges at a greater rate in a downward direction, or in other words more than approximately 5%. With this type of arrangement, a modified body means 62 is provided.

Body means 62 is substantially frusto-conical in configuration as seen most clearly in FIG. 9, it being noted that a bore 63 is formed centrally therethrough and of course is of frusto-conical configuration. As in the previous modification, body means 62 is fixedly supported in the central part of the upper end of the draft tube and is disposed substantially concentrically therewith. It will be understood that body means 62 is symmetrical about a longitudinally extending axis which coincides with the axis of the draft tube.

Body means 62 is fixedly mounted in position by a first plurality of support members 64 and a second plurality of support members 66 similar to those previously described. It will be noted as seen particularly in FIG. 9 that the outer and inner surfaces of the body means 62 are disposed at substantially the same angle of divergence as the inner surface of the draft tube, and axially extending portions of the inner and outer surfaces of body means 62 are oriented so as to be approximately in line with the flow of water from the turbine runner when it is operating at its design load.

As in the previously described modification, the top part of the body means is spaced below the top of the draft tube a distance within the same ranges as the distance $x$ described in connection with the previous modifications.

In addition, the inner diameter at the upper end of the bore within the body means 62 is within the same ranges as the distance $d_1$ previously discussed, and the length of the bore within body means 62 is also within the ranges of $l$ as previously described.

Figure 10:
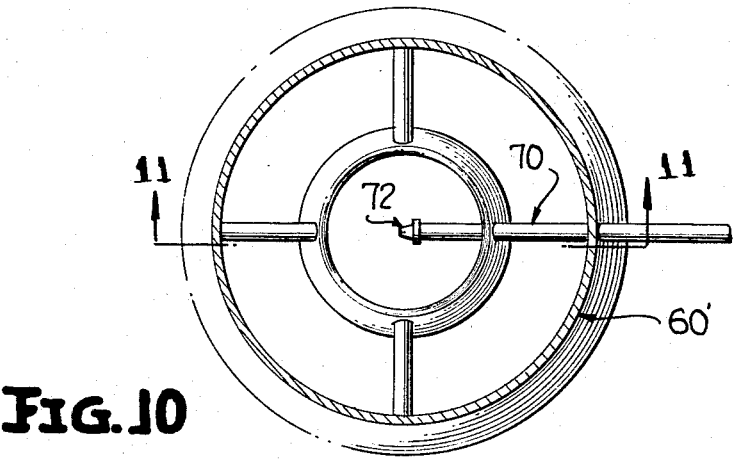
FIG. 10 is a top view of a draft tube incorporating a further modified form of flow control means.
Figure 11:
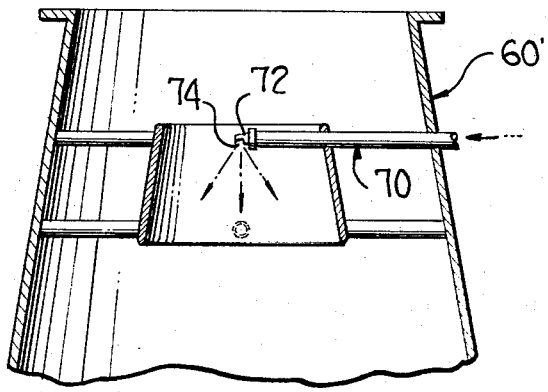
FIG. 11 is a sectional view taken substantially along line 11—11 of FIG. 10 looking in the direction of the arrows.

Referring now to FIGS. 10 and 11, a further modified form of the invention is illustrated which is similar to that shown in FIGS. 7–9. The draft tube, body means and support members are substantially the same as those previously illustrated and are provided with the same reference numerals primed. The only difference in the modifications shown in FIGS. 10 and 11 is the provision of a support member 70 which is substituted for one of the support members 64, this support member 70 being hollow and terminating in a nozzle 72 having a discharge 74 facing in a downward direction. This discharge nozzle is located in the central upper portion of the bore within body means 62'.

Hollow support member 74 is adapted to be connected to a suitable source of external gas pressure such as air under pressure which can be controlled by a suitable valve and the like so as to admit gas or air into the central upper portion of the bore within the body means so as to cushion shocks and to smooth out flow of liquid through the flow control means.

It is apparent from the foregoing that there is provided according to the present invention new and novel hydraulic turbine apparatus including an improved draft tube construction which results in a substantial reduction of noise, vibration, pressure surges and power swings by providing flow control means which stabilizes the flow and reduces the vortex within the moving liquid. The performance of the turbine is not appreciably affected at design load and is substantially improved at loads above and below the design load with no appreciable loss in power or efficiency. The apparatus is quite simple and inexpensive in construction, yet is very efficient and reliable in operation.

As this invention may be embodied in several forms without departing from the spirit or essential characteristics thereof, the present embodiment is therefore illustrative and not restrictive, and since the scope of the invention is defined by the appended claims, all changes that fall within the metes and bounds of the claims or that form their functional as well as conjointly cooperative equivalents are therefore intended to be embraced by those claims.

I claim:

1. Hydraulic turbine apparatus comprising a runner, a draft tube operatively associated with said runner and having a certain inner diameter at its upper portion, the top of said draft tube being disposed below the under surface of said runner so that the runner does not extend into said draft tube, flow control means comprising a generally annular body means defining a central bore therethrough, said body means being fixed in the upper part of said draft tube and being spaced from the inner surface thereof and in concentric relationship therewith, the upper part of said body means being spaced below the top of said draft tube in a direction away from said runner a distance which is at least approximately 20% of said inner diameter of the top portion of the draft tube.

2. Apparatus as defined in claim 1, wherein said distance is no greater than approximately 50% of the inner diameter of the top portion of the draft tube.

3. Hydraulic turbine apparatus including a runner, a draft tube operatively associated with said runner and having a certain inner diameter at the top portion thereof, the top of said draft tube being disposed below the under surface of said runner so that the runner does not extend into said draft tube, flow control means including a tubular body means defining a central bore formed therethrough, said central bore having an inner diameter and a length, the upper part of said body means being spaced below the top of said draft tube in a direction away from said runner a distance within the range of approximately 20% to approximately 50% of the inner diameter of the top portion of the draft tube, the inner diameter of said bore being within the range of approximately 20% to approximately 70% of the inner diameter of said inner diameter at the top portion of the draft tube.

4. Apparatus as defined in claim 3 wherein the length of said bore is within the range of approximately 20% to approximately 50% of the inner diameter at the top portion of the draft tube.

5. Hydraulic turbine apparatus including a runner, a draft tube operatively associated with said runner and having a certain inner diameter at the top portion thereof, the top of said draft tube being disposed below the under surface of said runner so that the runner does not extend into said draft tube, said draft tube being elongated about a longitudinal axis, flow control means comprising an annular body means formed symmetrically about a longitudinally extending axis which coincides with the axis of said draft tube, said body means being spaced from the inner surface of said draft tube and being fixed within the upper part of the draft tube, said body means including a substantially continuous imperforate side wall portion, said body means defining a central bore formed therethrough having a certain inner diameter and length, the thickness of the side wall portion of said body means being many times less than the inner diameter and length of said bore, the top of said body means being spaced below the top of the draft tube in a direction away from said runner a distance within the range of approximately 20% to approximately 50% of the inner diameter at the top portion of the draft tube, the inner diameter of said bore being within the range of approximately 20% to approximately 70% of the inner diameter at the top portion of the draft tube, and the length of said bore being within the range of approximately 20% to approximately 50% of the inner diameter at the top portion of the draft tube.

6. Hydraulic turbine apparatus including a runner, a draft tube operatively associated with said runner and having a certain inner diameter at the top portion thereof, the top of said draft tube being disposed below the under surface of said runner so that the runner does not extend into said draft tube, flow control means comprising a substantially cylindrical ring means supported in fixed relationship in the upper part of the draft tube and being spaced from the inner surface of the draft tube and in substantially concentric relationship therewith, said cylindrical ring means defining a bore formed therethrough having a certain inner diameter and length, the upper end of said cylindrical ring means being spaced below the top of said draft tube in a direction away from said runner a distance within the range of approximately 20% to approximately 50% of said inner diameter at the top portion of the draft tube, the inner diameter of said bore being within the range of approximately 20% to approximately 70% of said inner diameter at the top portion of the draft tube, and the length of said bore being in the range of approximately 20% to approximately 50% of the inner diameter at the top portion of the draft tube.

7. Hydraulic turbine apparatus comprising a runner, a draft tube operatively associated with said runner, said draft tube diverging in a downward direction at a rate greater than five percent, the top of said draft tube being disposed below the under surface of said runner so that the runner does not extend into said draft tube, flow control means comprising a substantially frustoconically shaped body means defining a central bore therethrough, said flow control means being fixed in the upper part of the draft tube and spaced from the inner surface of the draft tube and in substantially concentric relationship therewith, the upper part of said flow control means being spaced below the top of said draft tube in a direction away from said runner a distance which is at least approximately twenty percent of the inner diameter of the top portion of the draft tube.

8. Hydraulic turbine apparatus comprising a runner, a draft tube operatively associated with said runner and having a certain inner diameter at the top portion thereof, the top of said draft tube being disposed below the under surface of said runner so that the runner does not extend into said draft tube, flow control means comprising a substantially frusto-conically shaped ring member defining a bore therethrough, said ring member being fixedly mounted within the upper part of the draft tube and spaced from the inner surface of the draft tube and in substantially concentric relationship therewith, the bore through said ring member having an inner diameter at the top part of the ring member and having a certain length, the upper part of said ring member being spaced below the top of said draft tube in a direction away from said runner a distance within the range of approximately 20% to approximately 50% of said inner diameter at the top portion of the draft tube, said inner diameter of the bore being within the range of approximately 20% to approximately 70% of the inner diameter at the top portion of the draft tube, and the length of said bore being within the range of approximately 20% to approximately 50% of said inner diameter at the top portion of the draft tube.

9. In the draft tube of a hydraulic turbine, flow control means including a generally tubular body means spaced from the inner surface of said draft tube and in substantially concentric relationship therewith, support means extending from the inner surface of said draft tube to said body means for fixedly mounting the body means in operative position, and streamlining means having a contoured outer surface adapted to smooth the flow of liquid about said support means, said streamlining means being movably mounted on said support means and freely movable so as to automatically adjust to the direction of flow of liquid about the streamlining means to offer the minimum disturbance to the flow of liquid thereabout.

10. Hydraulic turbine apparatus comprising a runner, a draft tube operatively associated with said runner, the top of said draft tube being disposed below the under surface of said runner so that the runner does not extend into said draft tube, tubular body means fixedly mounted in the upper part of the draft tube and spaced from the inner surface of the draft tube and substantially concentrically therewith, said tubular body means being spaced below the top of said draft tube in a direction away from said runner, said body means being open at both the top and bottom ends thereof and defining a central bore extending therethrough, and means for introducing gas into the central upper portion of said bore defined within the body means.

References Cited by the Examiner
UNITED STATES PATENTS

| 2,507,796 | 5/1950 | Martin | 253—117 |
| 3,051,441 | 8/1962 | Sproule | 253—117 |

FOREIGN PATENTS

| 1,162,872 | 4/1958 | France. |
| 839,964 | 6/1960 | Great Britain. |

EDGAR W. GEOGHEGAN, *Primary Examiner.*

EVERETTE A. POWELL, JR., *Examiner.*